(12) United States Patent
Kassner (10) Patent No.: US 7,458,249 B2
(45) Date of Patent: Dec. 2, 2008

(54) METHOD AND DEVICE FOR OPERATING AN INTERNAL COMBUSTION ENGINE

(75) Inventor: Uwe Kassner, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/367,995

(22) Filed: Mar. 2, 2006

(65) Prior Publication Data

US 2006/0207526 A1   Sep. 21, 2006

(30) Foreign Application Priority Data

Mar. 21, 2005   (DE) ................ 10 2005 012 942

(51) Int. Cl.
G01L 23/22 (2006.01)
G01M 15/00 (2006.01)
F01N 11/00 (2006.01)
G06F 19/00 (2006.01)

(52) U.S. Cl. .................. 73/35.06; 73/114.02; 60/602; 60/324; 701/102

(58) Field of Classification Search .............. 60/602, 60/324, 605.2; 701/100–102, 107, 111, 114; 123/435–436; 73/117.3, 118.1, 35.03, 35.06, 73/114.01, 114.02, 114.03, 114.06, 114.07
See application file for complete search history.

(56) References Cited

U.S. PATENT DOCUMENTS

| 5,076,908 | A   | 12/1991 | Stangeland et al. |
| 5,353,636 | A   | 10/1994 | Sakurai et al. |
| 5,824,890 | A   | 10/1998 | La Palm et al. |
| 6,687,601 | B2* | 2/2004  | Bale et al. ............ 701/108 |
| 2002/0129799 | A1* | 9/2002 | Wang et al. ......... 123/568.16 |

FOREIGN PATENT DOCUMENTS

| DE | 40 02 208 | 8/1991 |
| EP | 1 039 287 | 9/2000 |
| GB | 2 343 001 | 4/2000 |
| JP | 08 144837 | 6/1996 |
| JP | 2000 170524 | 6/2000 |
| JP | 2000 205033 | 7/2000 |
| WO | WO 90/02874 | 3/1990 |
| WO | WO 95/02174 | 1/1995 |
| WO | WO 95/16856 | 6/1995 |
| WO | WO 99/44028 | 9/1999 |

* cited by examiner

*Primary Examiner*—Stephen K Cronin
*Assistant Examiner*—Ka Chun Leung
(74) *Attorney, Agent, or Firm*—Kenyon & Kenyon LLP (57) ABSTRACT

A method and a device for operating an internal combustion engine which allow monitoring of errors during combustion without using a pressure sensor are provided. The internal combustion engine includes a final controlling element in an exhaust system of the internal combustion engine and a signal production unit for producing a signal as a function of a setting of the final controlling element. The signal is analyzed for a characteristic property of the signal. A value for the characteristic property of the signal is compared to a predefined value. An error is recognized as a function of a deviation of the value for the characteristic property of the signal from the predefined value during a fired operation of the internal combustion engine.

13 Claims, 4 Drawing Sheets

METHOD AND DEVICE FOR OPERATING AN INTERNAL COMBUSTION ENGINE

FIELD OF THE INVENTION

The present invention is directed to a method and a device for operating an internal combustion engine.

BACKGROUND INFORMATION

Methods and devices for operating an internal combustion engine using a final controlling element in an exhaust system of the internal combustion engine and using signal production means for producing a signal as a function of a setting of the final controlling element are known in the art.

Thus, engines having turbocharging and including a bypass to the turbine of the exhaust gas turbocharger having a waste-gate valve for controlling the boost pressure are already known. An engine controller controls this waste-gate valve in a suitable manner in order to set a specific boost pressure as a function of the operating point of the engine. Use of an electrical actuator for the waste-gate valve, in which an electrical drive moves the waste-gate valve via a lever mechanism, is known in this case. This electrical drive is provided with a position sensor, such as a potentiometer. The output signal of the position sensor is used in the engine controller for optimal control of the waste-gate valve.

Furthermore, it is known that the recognition of misfires is required for internal combustion engines. Misfires cause a significant increase in the exhaust gas emissions, but they may also cause a high thermal load and therefore damage to a catalytic converter in the exhaust system. Diagnostic methods for recognizing misfires are known in the art.

Published U.K. patent document GB 234 3001, published International patent document WO 99/44028, and published international patent document WO 95/02174 describe the measuring and monitoring of pressure pulsations in the exhaust system via pressure sensors or pressure switches. U.S. Pat. No. 5,824,890, published Japanese patent document JP-2000 205 033, and published Japanese patent document JP-2000 17 05 24 describe the measuring and monitoring of the nonuniformity of the engine speed via a sensor on the crankshaft of the engine. Published European patent document EP 1 039 287, published international patent document WO 90/02874, and published German patent document DE 40 02 208 describe the measuring and monitoring of the exhaust gas composition via suitable sensors, such as HC sensors or lambda probes. U.S. Pat. No. 5,353,636 describes the measuring and monitoring of the torque output via a torque sensor on the crankshaft. Published Japanese patent document JP 08 144 837, U.S. Pat. No. 5,076,908, and published international patent document WO 95/16856 describe the measuring of the cylinder pressure and the monitoring of variables derived therefrom.

SUMMARY

The method according to the present invention and the device according to the present invention have the advantage over the related art that a value for a characteristic property of the signal is compared to a predefined value and an error is recognized as a function of the deviation of the value for the characteristic property of the signal from the predefined value during a fired operation of the internal combustion engine. In this way, misfires during the fired operation of the internal combustion engine may be recognized by monitoring pressure pulsations in the exhaust system, without a pressure sensor being necessary for this purpose.

Error recognition may be performed in a particularly simple and inexpensive manner if the signal is analyzed for signal fluctuations as the characteristic property of the signal and if an error is recognized for the case in which an amplitude of the signal fluctuations falls below a predefined threshold value during a fired operation of the internal combustion engine.

Simple and reliable error recognition is also achieved in that a chronological signal gradient or a signal gradient in relation to the crankshaft angle is analyzed as the characteristic property of the signal, and an error is recognized in the case in which the gradient maintains its sign longer than a predefined time or for a crankshaft angle range beyond a predefined angle range during a fired operation of the internal combustion engine.

A simple and cost-effective implementation of the present invention is made possible if a chronological mean value of the signal is analyzed as the characteristic property of the signal and if an error is recognized in the case in which the absolute value of the mean value deviates by more than a predefined tolerance value from a predefined value during a fired operation of the internal combustion engine.

Especially reliable error recognition is achieved in that a frequency spectrum of the signal is analyzed as the characteristic property of the signal and an error is recognized in the case in which at least one frequency component of the frequency spectrum which is characteristic for an error during combustion, e.g., a misfire, occurs at an amplitude above a predefined tolerance value during a fired operation of the internal combustion engine.

The method according to the present invention may be implemented particularly simply if the position of the final controlling element or an electrical drive for setting the final controlling element is detected by a position sensor, e.g., a potentiometer, and the position sensor is selected as the signal production means for producing the signal as a function of the setting of the final controlling element. In this way, the position sensor already provided may also be used for analyzing the signal fluctuations, so that its functionality is increased.

Furthermore, it is advantageous if the final controlling element is set by an armature, which is connected to the final controlling element, in a magnetic field of an activation coil and the activation coil is selected as the signal production means for producing the signal as a function of the setting of the final controlling element. In this way, an already provided activation coil, which is used for activating and setting the final controlling element, may additionally be used for analyzing the signal fluctuations, so that the functionality of the activation coil is increased.

The extraction of the signal fluctuations from the signal of the signal production means and the analysis of the frequency spectrum of the signal may be implemented especially simply with the aid of filtering.

The filtering may be implemented particularly reliably if at least one filter whose passband is set as a function of an engine speed of the internal combustion engine is used.

The reliability of the error recognition is increased if the deviation of the value for the characteristic property of the signal from the predefined value is analyzed as a function of an operating point of the internal combustion engine.

Furthermore, it is advantageous if an error during combustion, e.g., a misfire, is detected in the case of error-free signal production as a function of the deviation of the value for the characteristic property of the signal from the predefined value during a fired operation of the internal combustion engine. Errors during combustion may be detected particularly simply in this way.

A further advantage results if an error in the signal production, e.g., because of a malfunction of the signal production means or the final controlling element, is detected in the case of error-free combustion, in particular combustion without misfires, as a function of the deviation of the value for the characteristic property of the signal from the predefined value during a fired operation of the internal combustion engine. In this way, the reliability of the signal production may also be monitored particularly easily.

DETAILED DESCRIPTION

Figure 1:
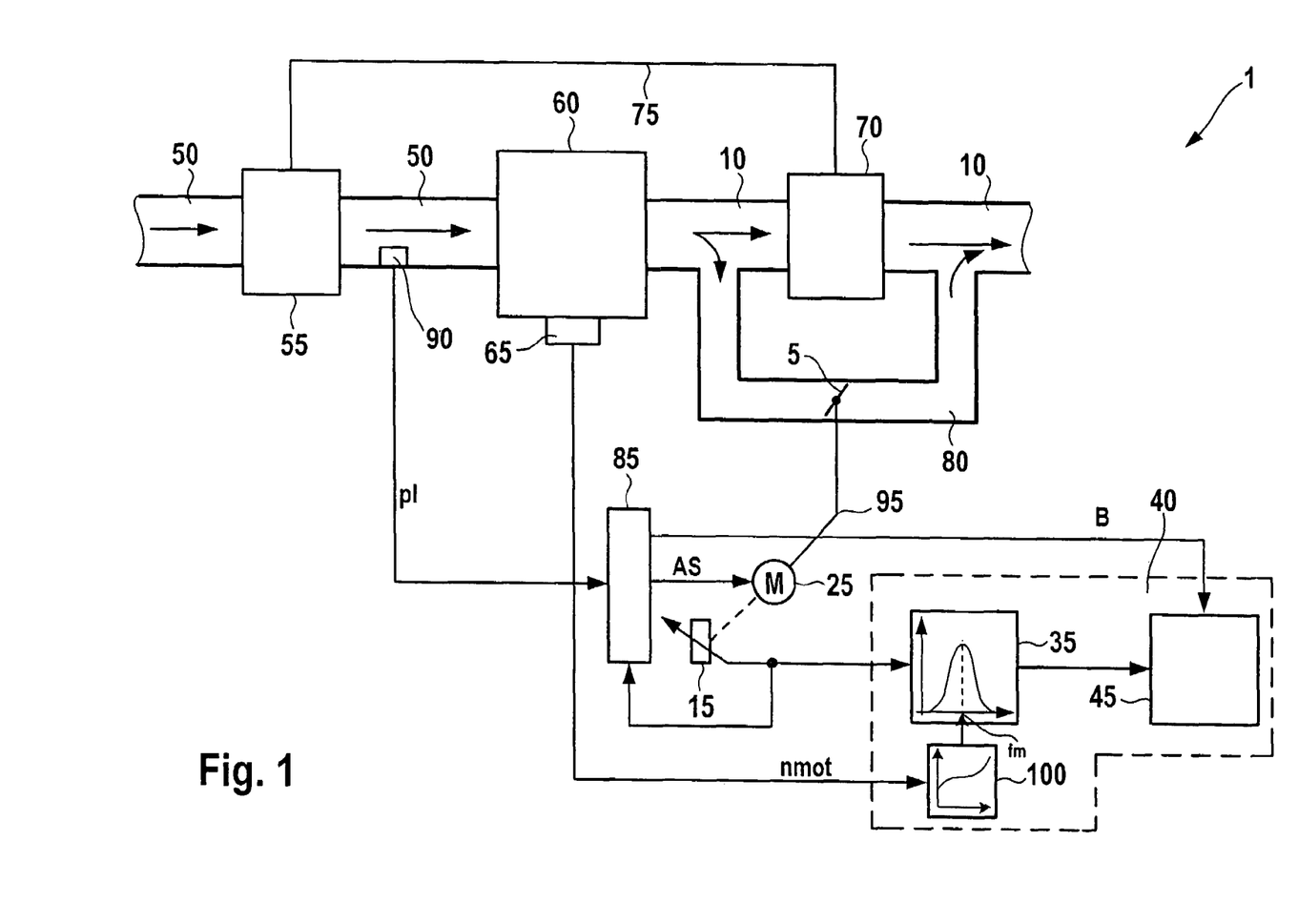
FIG. 1 shows a block diagram of an internal combustion engine according to a first example embodiment of the present invention.

In FIG. 1, 1 identifies an internal combustion engine, which may drive a vehicle, for example. Internal combustion engine 1 is designed as a gasoline engine or as a diesel engine, for example. A cylinder block 60 including one or more cylinders of internal combustion engine 1 is supplied with fresh air via an air supply 50. The flow direction of the fresh air in air supply 50 is identified in FIG. 1 by arrows shown in the air supply. A compressor 55 compresses the fresh air supplied to cylinder block 60 via air supply 50. A boost-pressure sensor 90, which measures boost pressure pl downstream from compressor 55 in air supply 50 and relays the measurement result to an engine controller 85, is positioned in air supply 50 downstream from compressor 55. Compressor 55 is driven via a shaft 75 by a turbine 70 in an exhaust system 10 of internal combustion engine 1. Compressor 55, turbine 70, and shaft 75 therefore form an exhaust gas turbocharger. The flow direction of the exhaust gas in exhaust system 10 of internal combustion engine 1 is also shown in FIG. 1 by arrows shown in the exhaust gas system 10. Exhaust system 10 also includes a bypass channel 80, which is also simply referred to in the following as a bypass. Bypass 80 bypasses turbine 70 in exhaust system 10. A final controlling element 5 is positioned in bypass 80, which element 5 is implemented as a bypass valve, for example, and influences the exhaust gas mass flow through turbine 70 depending on the degree of opening.

Furthermore, FIG. 1 shows an electrical drive 25 in the form of an electric motor, which acts on bypass valve 5 via a lever mechanism 95 to change its degree of opening. Electric motor 25 is activated by engine controller 85 via an activation signal AS. Engine controller 85 includes a boost-pressure control, for example, which compares boost pressure pl measured by boost-pressure sensor 90 to a setpoint value predefined as a function of the operating state of internal combustion engine 1 and produces activation signal AS as a function of this comparison, with the object of boost pressure pl measured by boost-pressure sensor 90 approaching the predefined setpoint value for the boost pressure. Also provided is first signal production means 15, which produces a signal as a function of the setting of bypass valve 5. In the example according to FIG. 1, first signal production means 15 is designed as a position sensor, which detects the position of electric motor 25 for the setting of bypass valve 5. Position sensor 15 may be implemented as a potentiometer, for example. The signal produced by position sensor 15 is characteristic for both the position of electric motor 25 and also for the position and/or the degree of opening of bypass valve 5. The degree of opening of a bypass valve 5 may alternatively also be detected directly by a position sensor in the form of a potentiometer, for example. In the following discussion relating to FIG. 1, however, it is assumed as an example that the signal production means is implemented as position sensor 15 for detecting the position of electric motor 25. The signal produced by position sensor 15 is supplied to a device 40. Device 40 may also be implemented using software and/or hardware in engine controller 85, for example. However, it may also be implemented separately from engine controller 85. Device 40 includes an analyzer unit 35 to which the signal of position sensor 15 is supplied.

Analyzer unit 35 analyzes the signal of position sensor 15 for a characteristic property. It relays a value for the characteristic property to an error recognition unit 45. Error recognition unit 45 compares the value for the characteristic property to a predefined value and recognizes an error as a function of a deviation of the value for the characteristic property of the signal from the predefined value during a fired operation of internal combustion engine 1.

According to a first exemplary embodiment of the present invention, analyzer unit 35 extracts signal fluctuations from the signal of position sensor 15 as the characteristic property. These signal fluctuations are supplied to error recognition unit 45, which compares the amplitude of the signal fluctuations extracted by analyzer unit 35 to a predefined threshold value. If the amplitude of the signal fluctuations extracted by analyzer unit 35 falls below the predefined threshold value, error recognition unit 45 recognizes an error. Error recognition unit 45 may provide an optical and/or acoustic warning indication as a reaction to the error recognition, for example. Further error reaction measures may include emergency operation of internal combustion engine 1, for example, by limiting the predefined setpoint value for the boost pressure to a predefined maximum value, by producing activation signal AS by engine controller 85 in such a way that electric motor 25 completely opens bypass valve 5 via lever mechanism 95 and thus deactivates exhaust gas turbocharger 55, 70, 75, or, as a final measure, by completely turning off internal combustion engine 1, for example, by completely interrupting the fuel supply and discontinuing the ignition.

Figure 3:
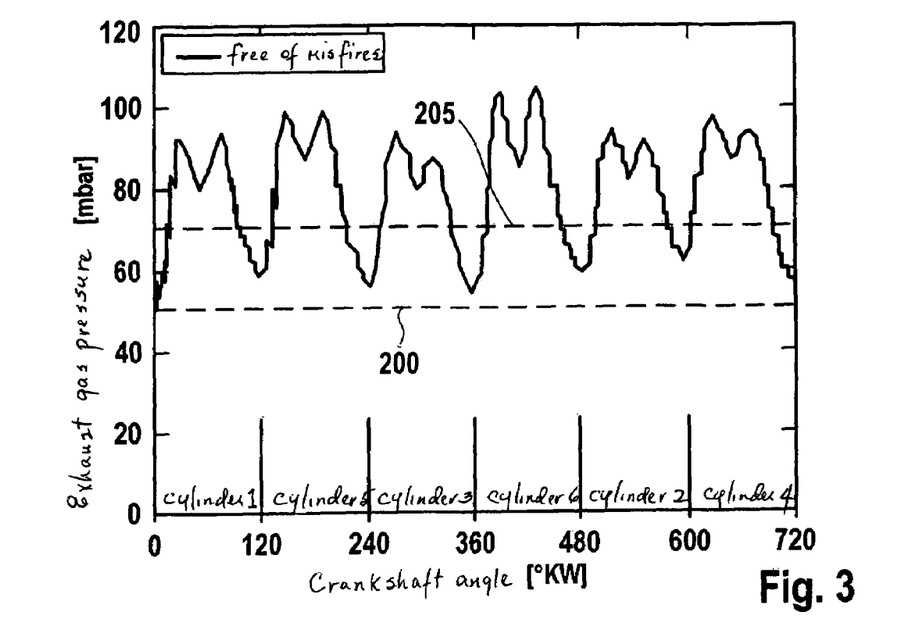
FIG. 3 shows a diagram of an exhaust gas pressure plotted over the crankshaft angle in the case of operation without misfires.

FIG. 3 shows an exemplary curve of an exhaust gas pressure Prel, in relation to a standard value, in mbar over crankshaft angle e in ° KW. In this case, a six-cylinder internal combustion engine 1 is assumed as an example. Every cylinder is fired in FIG. 3 and has a signal fluctuation between approximately 55 and 105 mbar for assigned relative exhaust gas pressure Prel during the firing. A lower limiting value is identified in FIG. 3 by reference numeral 200, which is at approximately 55 mbar and below which the signal fluctuations of the exhaust gas pressure do not fall during fired operation of a cylinder. Lower limiting value 200 thus identifies a lower limiting value for the amplitude of relative exhaust gas pressure Prel. Furthermore, a mean value of relative exhaust gas pressure Prel is identified in FIG. 3 by reference numeral 205. The exhaust gas pressure is applied to bypass valve 5 with a force proportional to the exhaust gas pressure and therefore produces a voltage signal proportional to relative exhaust gas pressure Prel at the output of position sensor 15. Therefore, the above-described predefined threshold value for the amplitude of the signal fluctuations of position sensor 15 may be selected proportionally to lower limiting value 200, the predefined threshold value also advantageously being able to be reduced by a tolerance interval for measurement imprecision and scattering interference signals.

Figure 5:
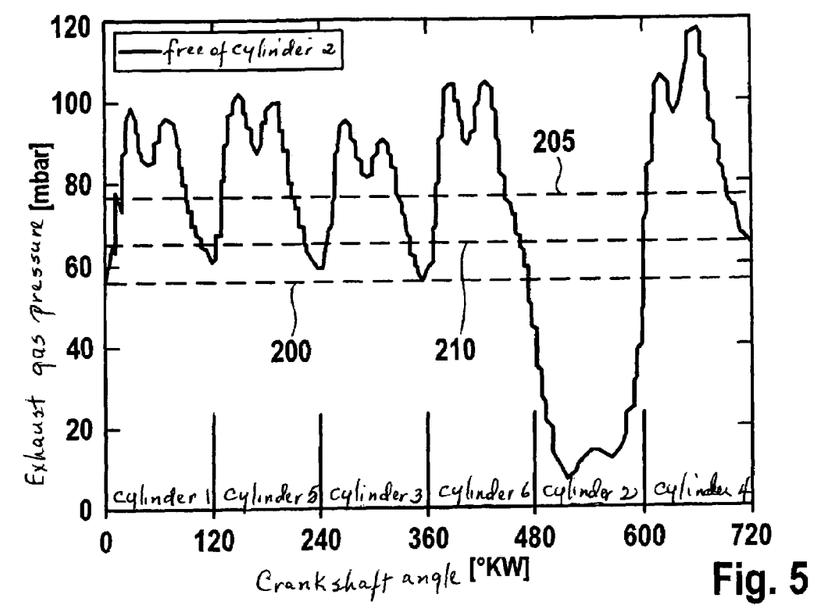
FIG. 5 shows a diagram of an exhaust gas pressure plotted over the crankshaft angle in the case of operation with misfires.

Proceeding from FIG. 3, FIG. 5 shows another exemplary curve of exhaust gas pressure Prel, in relation to the standard value in mbar, over crankshaft angle e in ° KW. Identical reference numerals in FIG. 5 identify identical elements as shown in FIG. 3. However, in contrast to FIG. 3, one of the cylinders of internal combustion engine 1, which is identified in FIG. 5 by "cylinder 2," misfires. The signal fluctuations of relative exhaust gas pressure Prel assigned to this cylinder between 480° KW. and 600° KW. fall significantly below lower limiting value 200. This results in the amplitude of the signal fluctuations of position sensor 15 also falling below the predefined threshold value and thus leads to an error recognition.

In addition, a modified mean value 210 of relative exhaust gas pressure Prel, which deviates below mean value 205 and is caused by the misfire of cylinder "cylinder 2," is plotted in FIG. 5.

The extraction of the signal fluctuations from the signal of position sensor 15 may be performed by analyzer unit 35 as a function of engine speed nmot of internal combustion engine 1. For this purpose, a speed sensor 65, which detects engine speed nmot of internal combustion engine 1 and relays the measured value to analyzer unit 35, is positioned in the area of cylinder block 60.

Otherwise, the output signal of position sensor 15 is supplied to engine controller 85, as shown in FIG. 1. The output signal of position sensor 15 is used in engine controller 85 for optimal control of bypass valve 5 and additionally allows monitoring of the reliability of electrical drive 25.

The pressure pulsations of the individual fired cylinders of cylinder block 60 of internal combustion engine 1 result in pressure pulsations of the exhaust gas in exhaust system 10, and in particular in bypass channel 80 therein, and produce a force on bypass valve 5 in all operating states of internal combustion engine 1 in which bypass valve 5 does not press against a mechanical stop. This force also acts in the opposite direction on the electrical drive, i.e., electric motor 25, via lever mechanism 95. If one now observes the output signal of position sensor 15, i.e., the resistance of the potentiometer, a pulsation in the form of one or more signal fluctuations is also to be observed there. This pulsation does not enter the boost-pressure control, and therefore the activation of bypass valve 5 via activation signal AS, because the dynamics of the control loop used are slow in comparison to the fluctuations of the potentiometer signal due to the pressure pulsations of the individually fired cylinders.

It is advantageous if analyzer unit 35 includes a filter or is implemented as a filter. It is assumed as an example in the following that analyzer unit 35 is implemented as a filter. Filter 35 is to be set in this example case so that its passband transmits the described signal fluctuations of the output signal of position sensor 15 because of the pressure pulsations of the exhaust gas in exhaust system 10, and in particular also in bypass channel 80 therein. This passband should not be too large, so that undesired coupling of interference signals does not incorrectly result in identification as a pressure fluctuation of the exhaust gas in exhaust system 10, and in particular in bypass channel 80 therein. Furthermore, the passband of filter 35 is not to be selected to be too small, so that the signal fluctuations of the output signal of position sensor 15 due to the cited pressure fluctuations of the exhaust gas may also be extracted reliably. The frequency width of the passband may be applied suitably on an engine test bench, for example, in order to fulfill the above-mentioned requirements. The frequency of the described pressure fluctuations in the exhaust gas is a function of current engine speed nmot. Therefore, the passband of filter 35 is to be adapted to current engine speed nmot. This may be performed by setting center frequency $f_m$ of the passband of filter 35 as a function of current engine speed nmot. For this purpose, engine speed nmot is supplied to filter 35 by speed sensor 65. A characteristic curve may be applied on a test bench, for example, which assigns each different engine speed nmot as an input variable to a center frequency $f_m$. The characteristic curve is identified in FIG. 1 by the reference numeral 100 and is also a component of device 40, in which the characteristic curve may be stored on a storage medium. For the application of the frequency width of the passband of filter 35 and characteristic curve 100, the pressure pulsations in the exhaust gas may additionally be measured in a typical way using a pressure sensor in exhaust system 10 and compared to the output signal of position sensor 15.

Characteristic curve 100 may advantageously be interpolated between the individual measured points, in order to provide an associated center frequency $f_m$ of the passband of filter 35 over the entire possible speed range.

Therefore, the position of the passband may be adapted continuously to current engine speed nmot measured by speed sensor 65 via its center frequency $f_m$. Filter 35 may be implemented in the form of a calculation rule, for example, whose parameters are determined according to known algorithms in such way that the desired passband having center frequency $f_m$ results. In the extreme case, the passband may be selected to be so small that it only transmits the frequency of the signal fluctuations in the output signal of position sensor 15 caused by the pressure pulsations in the exhaust gas. This frequency ideally corresponds to center frequency $f_m$. The filtered signal fluctuations of the output signal of position sensor 15 which are caused by the pressure pulsations in the exhaust gas of internal combustion engine 1 are then applied to the output of filter 35 and are supplied to error recognition unit 45. In addition, a firing signal B, which specifies how many of the cylinders of cylinder block 60 have just currently been fired, i.e., have been supplied with air, fuel, and—in the case of a gasoline engine—also with external ignition, is supplied to error recognition unit 45 by engine controller 85. Error recognition unit 45 compares the amplitude of the output signal of filter 35 to a predefined threshold value. If at least one of the cylinders of cylinder block 60 has been fired according to signal B and the amplitude of the output signal of filter 35 (and therefore the amplitude of the signal fluctuations filtered out by filter 35) are below the predefined threshold value, error recognition unit 45 recognizes an error and initiates one of the described error measures, for example. The predefined threshold value may be selected as a function of an operating point of internal combustion engine 1. In particular, the predefined threshold value may be selected as a function of the number of currently fired cylinders of cylinder block 60 specified according to signal B. The higher the number of currently fired cylinders of cylinder block 60, the higher the predefined threshold value may be selected to be. This is because the amplitude of the pressure pulsations in the exhaust gas, and thus also the amplitude of the signal fluctuations at the output of filter 35, also rise as the number of currently fired cylinders of cylinder block 60 increases.

If the combustion misfires in one or more of the currently fired cylinders of cylinder block 60, this results in a reduction of the amplitude of the pressure pulsations in the exhaust gas and therefore also in a reduction of the amplitude of the signal at the output of filter 35. If none of the cylinders has fired, signal B is set to zero. The predefined threshold value is to be selected for the particular assigned number of currently fired cylinders in such a way that even in the event of a misfire of one of the currently fired cylinders of cylinder block 60, the amplitude of the signal at the output of filter 35 reliably falls below this predefined threshold value. Vice versa, the predefined threshold value for the number of currently fired cylinders is to be selected in such way that if there are no misfires, this predefined threshold value is reliably exceeded by the amplitude of the signal at the output of filter 35. Furthermore, the predefined threshold value may also be selected as a function of at least one further operating variable of internal combustion engine 1, such as an air mass flow supplied to internal combustion engine 1, boost pressure pl, the degree of opening of a throttle flap (not shown in FIG. 1) in air supply 50, engine speed nmot, and/or at least one further operating variable of internal combustion engine 1. For this purpose, for example, a characteristic curve, which assigns different predefined threshold values to the cited operating variables as input variables of the ignition map, including signal B for the number of currently fired cylinders of cylinder block 60 for different measured points, may be applied on a test bench, this ignition map also being able to be stored in a storage component of device 40. In operation of internal combustion engine 1, the assigned predefined threshold value for the error recognition may then be taken for the particular operating point of internal combustion engine 1 which is characterized by the corresponding input variables of the ignition map. The ignition map may also be interpolated between the individual measured points, so that an assigned predefined threshold value for the error recognition may be obtained for all operating points of internal combustion engine 1 which are characterized by the employed input variables of the ignition map.

During the application of the ignition map on the test bench, a predefined threshold value for the current values of the remaining operating variables of the internal combustion engine 1 used as the input variables of the ignition map is to be selected for the particular number of currently fired cylinders of cylinder block 60, which is securely below the amplitude of the output signal of filter 35 without misfires and is securely above the amplitude of the output signal of filter 35 with at least one misfire in one of the currently fired cylinders.

The above-described recognition of errors during the combustion, e.g., in this exemplary embodiment the recognition of misfires in at least one currently fired cylinder, and therefore the recognition of an undesired misfire, requires, if it is to be reliable, that the signal production by position sensor 15 be error-free. As described, the output signal of position sensor 15 is also supplied to engine controller 85. In addition to the described optimization of the activation of bypass valve 5, this controller is also used for monitoring the reliability of electrical drive 25. If there is an error here, the signal production by position sensor 15 is possibly faulty and therefore the described error recognition by error recognition unit 45 is no longer reliable. Therefore, if engine controller 85 recognizes a faulty reliability of electrical drive 25, it sets signal B to zero. This corresponds to the case in which none of the cylinders of cylinder block 60 has fired, so that the predefined threshold value is also set to zero. Error recognition by error recognition unit 45 is then no longer possible, because the amplitude of the output signal of filter 35 may no longer fall below the value zero of the predefined threshold value. In this way, the error recognition by error recognition unit 45 is deactivated. Error recognition unit 45 is therefore only activated when signal B of engine controller 85 is greater than zero, i.e., when at least one cylinder is fired and the output signal of position sensor 15, and therefore the signal production by position sensor 15, are not recognized as faulty by engine controller 85. In this case, an error in the signal production may also be caused by a malfunction of position sensor 15 or a malfunction of bypass valve 5 or a malfunction of lever mechanism 95. In all of these cases, engine controller 85 will recognize the output signal of position sensor 15 as faulty. The output signal of position sensor 15 may be monitored by engine controller 85, for example, in that the plausibility of the output signal of position sensor 15 is checked in engine controller 85 using an output signal of a position sensor for ascertaining the position of bypass valve 5. Such a position sensor for detecting the position of bypass valve 5 and relaying it to engine controller 85 is not shown in FIG. 1 for reasons of clarity.

The reliability of position sensor 15, electric motor 25, lever mechanism 95, and bypass valve 5 may also be monitored using the described method according to the present invention and device 40 according to the present invention. If at least one of the cylinders of cylinder block 60 of internal combustion engine 1 is currently fired and all currently fired cylinders of cylinder block 60 have error-free combustions, i.e., have no misfires in particular, a signal component corresponding to the pressure pulsations in the exhaust gas must occur at the output of position sensor 15 and therefore also at the output of filter 35. However, if only a constant signal without a pulsation component appears at the output of position sensor 15 and therefore no signal, and thus no signal amplitude, appear at the output of filter 35, there is a faulty state of position sensor 15, electric motor 25, lever mechanism 95, and/or bypass valve 5. Therefore, in the case of error-free combustion, in particular combustion without misfires in the actively fired cylinders of cylinder block 60, an error may be detected in the signal production by error recognition unit 45, e.g., because of a malfunction of position sensor 15, electric motor 25, lever mechanism 95, and/or bypass valve 5, if the amplitude of the signal fluctuations at the output of filter 35 falls below the predefined threshold value. The error-free combustion may be ascertained in a typical way by engine controller 85, for example, with the aid of a pressure sensor in exhaust system 10 for measuring and monitoring pressure pulsations in the exhaust gas or in other ways conventional in the art, for example. This is not shown in FIG. 1 for reasons of clarity. For the case of detected faulty combustion, i.e., combustion with misfires in at least one of the actively fired cylinders of cylinder block 60, engine controller 85 may again set signal B to zero, as described above, so that error recognition unit 45 is deactivated in the way described above and the described error recognition is thus turned off during signal production. Otherwise, an error is recognized during signal production by error recognition unit 45 if the amplitude of the signal at the output of filter 35 is below the threshold value just predefined. Otherwise, no error is recognized during signal production. The predefined threshold value is selected as described above, signal B again specifying the number of currently fired cylinders of cylinder block 60, unless the combustion is faulty as described, so that B is set to zero.

According to a second exemplary embodiment according to the present invention, a chronological signal gradient or a signal gradient in relation to the crankshaft angle is analyzed as the characteristic property of the signal by analyzer unit 35. For this purpose, analyzer unit 35, which is no longer exclusively implemented as a filter, produces the described signal gradients of position sensor 15, the signal of position sensor 15 being able to be filtered in the way described in the first exemplary embodiment in order to extract the signal fluctuations. Error recognition unit 45, to which the gradient is supplied, now checks, in the case of the fired operation of internal combustion engine 1, whether the gradient maintains its sign longer than a predefined time or for a crankshaft angle range beyond a predefined angle range. The predefined time and/or the predefined angle range is/are to be applied on a test bench, for example, in such a way that a clear and reliable differentiation of a fired cylinder with or without misfires is possible. In the case of the predefined time, the current engine speed is to be considered in the application. As shown in FIG. 5, the amplitude of relative exhaust gas pressure Prel for fired cylinder "cylinder 2" with a misfire drops again from approximately 480° KW., instead of, as in FIG. 3 without a misfire, rising again after a relative minimum upon the transition of the firing from cylinder "cylinder 6" to cylinder "cylinder 2." Therefore, without a misfire, a sign change of the gradient of relative exhaust gas pressure Prel and therefore of the possibly filtered signal of position sensor 15, which is proportional thereto, would result. In the case of a misfire, such a sign change does not occur. As shown in FIG. 5, a gap remains in the chronological periodic sign change curve or periodic sign change curve in relation to the crankshaft angle in this case, which is recognized with suitable application of the predefined time and/or the predefined angle range. This is also true for the crankshaft angle from approximately 600°, at which cylinder "cylinder 2" changes over to cylinder "cylinder 4" in the firing. Therefore, two gaps in the otherwise periodic curve of the sign change of the gradient result per fired cylinder with a misfire. Unfired cylinders also result in two such gaps each in the curve of the sign change of the gradient.

Error recognition unit 45 obtains the information as to how many of the cylinders of internal combustion engine 1 are currently fired via signal B. By comparing the number of gaps in the curve of the sign change of the gradient, determined with the aid of the predefined time and/or the predefined angle range, to the number of permissible gaps on the basis of the number of unfired cylinders according to signal B, error recognition unit 45 thus recognizes an error in the event of a deviation.

According to a third exemplary embodiment according to the present invention, a chronological mean value of the signal is analyzed as a characteristic property of the signal by analyzer unit 35. For this purpose, analyzer unit 35, which is also no longer exclusively implemented as a filter, calculates the described mean value of the signal of position sensor 15, the signal of position sensor 15 being able to be filtered in the way described in the first exemplary embodiment in order to extract the signal fluctuations. Error recognition unit 45, to which the mean value is supplied, now checks, in the case of the fired operation of internal combustion engine 1, whether the absolute value of the mean value deviates by more than one predefined tolerance value from a predefined value. In this case, an error is recognized.

The predefined value for the mean value may be applied on a test bench as a function of the number of the currently fired cylinders and in the event of error-free combustion, in particular without misfires, for example. If all cylinders of internal combustion engine 1 have fired without misfires, mean value 205 results as the predefined value for the mean value according to the example shown in FIG. 3. As the number of fired cylinders without misfires decreases, the predefined value for the mean value is reduced, because relative exhaust gas pressure Prel drops for the crankshaft angle ranges of the unfired cylinders. The actually existing mean value is lowered to value 210 in the case of firing of all cylinders and with a misfire in one of the cylinders as shown in FIG. 5.

Therefore, a different value for the mean value is predefined depending on the number of currently fired cylinders. The actually resulting mean value is then compared to the predefined mean value by error recognition unit 45. If the absolute value of the difference of the two values exceeds the predefined tolerance value, error recognition unit 45 recognizes an error. The predefined tolerance value may be predefined independently of the number of fired cylinders. For example, it may be applied on a test bench in such a way that deviations from the predefined mean value which result because of measurement imprecisions by position sensor 15, for example, or due to scattering interference signals do not result in error recognition, but errors in combustion, in particular misfires, are recognized reliably.

Alternatively, the predefined tolerance value may also be applied as a function of the number of currently fired cylinders. As the predefined mean value decreases, the predefined tolerance value may also be selected to be smaller to prevent any loss of sensitivity in error recognition.

The particular predefined mean value or actually existing mean value ascertained by analyzer unit 35 is to be understood as the mean value over 720° KW.

Since different deviations of the actually existing mean value from the predefined mean value occur depending on the number of fired cylinders having misfires, error recognition unit 45 may conclude the number of fired cylinders having misfires and/or having errors during combustion in general from the level of the deviation. The deviation increases as the number of currently fired cylinders having misfires increases. Therefore, for every possible number of fired cylinders having misfires, a different predefined tolerance value may be applied. As the number of fired cylinders with misfires increases, the predefined tolerance value increases. If the absolute value of the deviation of predefined and ascertained actually predefined mean values exceeds the tolerance value for a specific first number of fired cylinders having misfires, but not the tolerance value for the next higher number of fired cylinders having misfires, error recognition unit 45 recognizes errors during combustion of the first number of fired cylinders.

According to a fourth exemplary embodiment according to the present invention, a frequency spectrum of the signal is analyzed as a characteristic property of the signal by analyzer unit 35. For this purpose, analyzer unit 35, which is also no longer exclusively implemented as a filter, calculates the described frequency spectrum of the signal of position sensor 15 using Fourier analysis, for example, the signal of position sensor 15 being able to be filtered in an analogous manner to that in the first exemplary embodiment in order to extract those frequency components of the signal of position sensor 15 which arise exclusively due to errors during combustion, in particular misfires. The corresponding frequencies may be ascertained on a test bench, for example.

The passband of the filter is then to be set in such a way that the frequency components of the signal of position sensor 15 produced by the combustion errors are transmitted. Error recognition unit 45, to which the frequency spectrum is supplied, now checks whether at least one frequency component of the frequency spectrum which is characteristic for a misfire and/or is only caused by a combustion error, occurs at an amplitude lying above a predefined tolerance value. In this case, an error is recognized. A single tolerance value for all frequency components solely caused by errors during combustion may be applied on a test bench, for example, in such a way that interference due to measurement imprecision or scattering interference signals does not result in error recognition, but combustion errors, in particular misfires, are recognized reliably.

Alternatively, a separate predefined tolerance value may be applied correspondingly for every frequency component caused solely by errors during combustion.

Ascertaining the frequency spectrum and the frequency components of the signal of position sensor 15 solely caused by errors during combustion and therefore—in the case of multiple different predefined tolerance values—the application of the predefined tolerance values are also performed as a function of the engine speed because of their dependency on the engine speed of the internal combustion engine.

Figure 4:
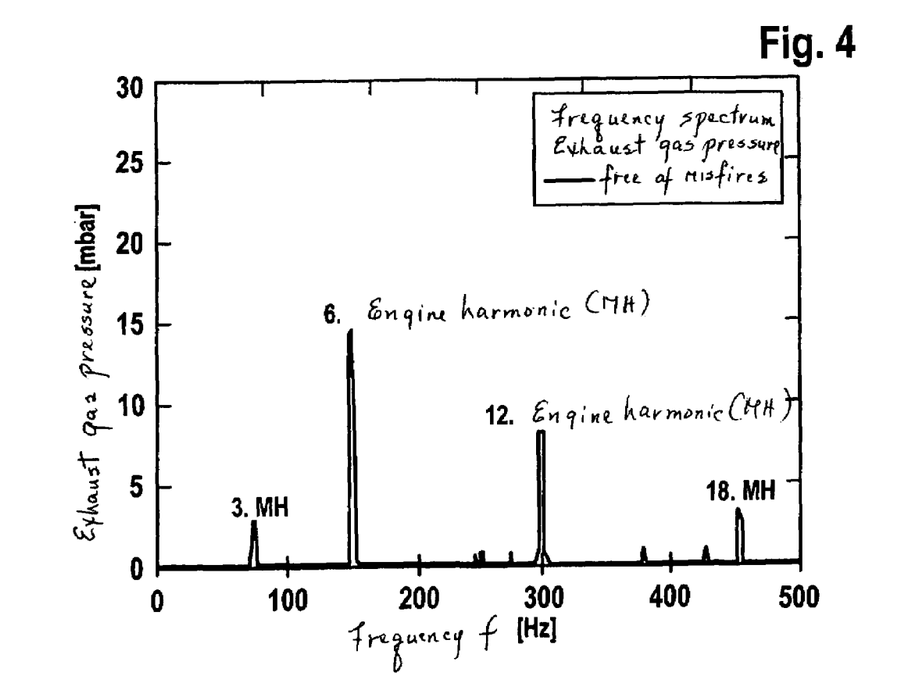
FIG. 4 shows an associated frequency spectrum of the exhaust gas pressure shown in FIG. 3.
Figure 6:
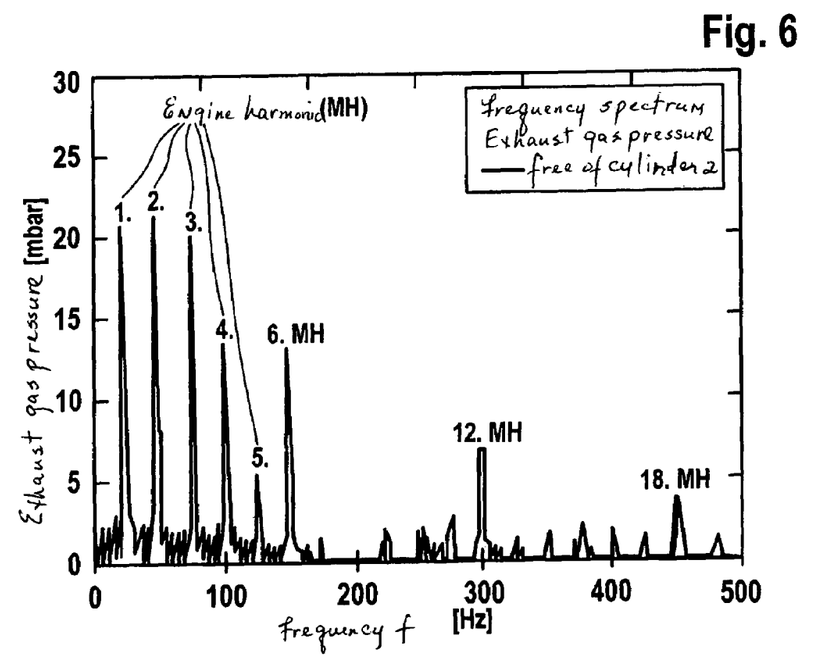
FIG. 6 shows an associated frequency spectrum of the exhaust gas pressure shown in FIG. 5.

FIG. 4 shows a frequency spectrum of relative exhaust gas pressure Prel in mbar over frequency f for an engine speed of 3000 rpm, which is assigned to the time curve of relative exhaust gas pressure Prel without errors during combustion. FIG. 6 shows a frequency spectrum of relative exhaust gas pressure Prel in mbar over frequency f for an engine speed of 3000 rpm, which is assigned to the time curve of relative exhaust gas pressure Prel with errors during combustion. A comparison of the diagrams in FIGS. 4 and 6 shows additional significant frequency components of relative exhaust gas pressure Prel, and therefore also of the signal of position sensor 15 in the area of the first, second, fourth, and fifth engine harmonics in case of error. Therefore, if error recognition unit 45 detects corresponding frequency components in the frequency spectrum provided by analyzer unit 35 above the assigned predefined tolerance value of 2 mbar, for example, an error is detected. FIG. 6 additionally shows a significantly elevated frequency component in the third engine harmonic in comparison to FIG. 4. Therefore, those frequency components of the signal of position sensor 15 which do not result solely from errors during combustion, but rather also result without such errors, may be investigated by error recognition unit 45 for the error recognition. These frequency components are also characteristic for a combustion error, in particular a misfire. A predefined tolerance value is then to be applied suitably for each of these frequency components on a test bench, for example, in such a way that interference due to measurement imprecision or scattering interference signals do not result in error recognition, but combustion errors, in particular misfires, are recognized reliably.

Thus, for example, the predefined tolerance value for the third engine harmonic may be selected to be somewhat larger than the amplitude value for the third engine harmonic without misfires, at approximately 4 mbar according to the example in FIG. 3.

According to an alternative fifth example embodiment of the present invention, which represents a simplified variation of the fourth example embodiment, the ascertainment of the frequency spectrum in analyzer unit 35 may be dispensed with, and one or more filters may instead be positioned in analyzer unit 35, each of which transmits exactly one frequency component of the signal of position sensor 15 caused solely by errors during combustion. The error recognition unit then checks the amplitude of the corresponding transmitted filter component at the output of the particular filter of analyzer unit 35 to see if it exceeds the assigned or generally predefined tolerance value, an error being recognized if at least one filter output exceeds the assigned predefined tolerance value.

Of course, at least one filter may additionally or alternatively be provided in the analyzer unit, its passband being selected in such a way that precisely one frequency component of the signal of position sensor 15 is transmitted, which is different from zero even without errors during combustion and its output being compared by error recognition unit 45, as described above as an example for the third engine harmonic, to the tolerance value predefined for this purpose for error recognition.

In the fourth and fifth exemplary embodiments, the use of signal B for recognizing errors during combustion is no longer necessary, since this error recognition is independent of the number of fired cylinders.

Figure 2:
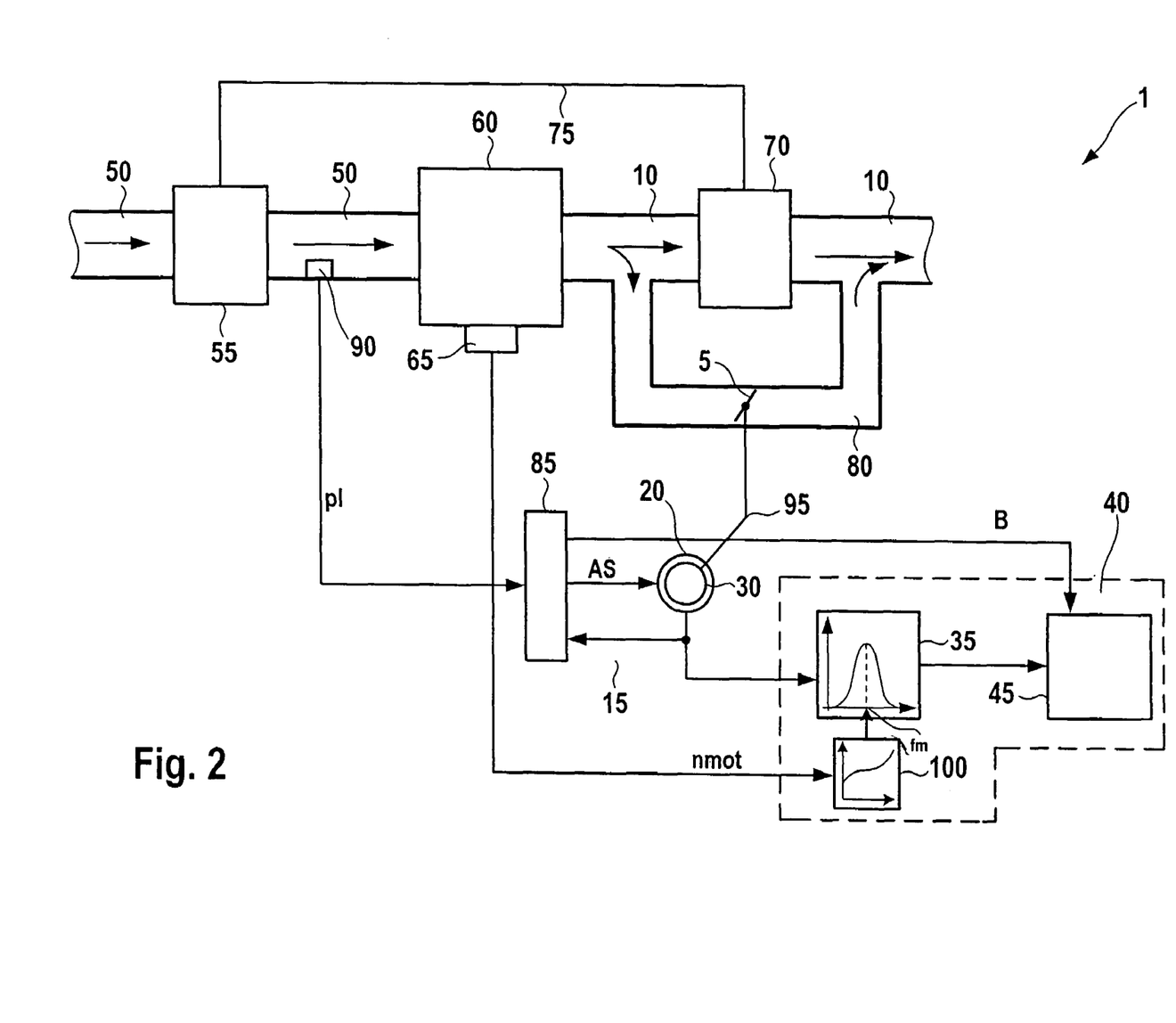
FIG. 2 shows a block diagram of an internal combustion engine according to a second example embodiment of the present invention.

A block diagram of an internal combustion engine according to an alternative example embodiment of the present invention is illustrated in FIG. 2. Identical reference numerals in FIG. 1 identify identical elements as shown in FIG. 2. The design and function of the embodiment in FIG. 2 is identical to the design and function of the embodiment in FIG. 1 with a single difference: in the exemplary embodiment in FIG. 2, bypass valve 5 is set to the desired degree of opening by an armature 30, which is connected to bypass valve 5 via lever mechanism 95, in a magnetic field of an activation coil 20, activation signal AS being supplied to activation coil 20 by engine controller 85. In this case, activation coil 20 is used as the signal production unit, so that no additional position sensor is required as in the embodiment in FIG. 1. The output signal of activation coil 20, which corresponds to activation signal AS plus the voltage induced in activation coil 20 by a possible movement of armature 30, is then supplied to filter 35 for signal analysis and to engine controller 85 for optimizing the control of bypass valve 5 and for monitoring the reliability of armature 30, activation coil 20, lever mechanism 95, and bypass valve 5. The signal analysis in device 40 and the activation optimization and monitoring in engine controller 85 are then executed in the way described in the exemplary embodiment according to FIG. 1. In the exemplary embodiment in FIG. 2, bypass valve 5 may be implemented as an electrical globe valve, for example. Bypass valve 5 and therefore armature 30 connected thereto are moved in the magnetic field of activation coil 20 by the exhaust gas pressure. The voltage thus induced may be observed on the electrical lines from activation coil 20 to device 40. Again, depending on the exemplary embodiment, only the alternating component in the frequency range caused by the pressure pulsations in the exhaust gas or only the frequency components of the signal of activation coil 20 characteristic for an error during combustion are of interest and are filtered by one or more filters of analyzer unit 35 in the way described, for example. Otherwise, the mode of operation of the exemplary embodiment in FIG. 2 corresponds to the mode of operation of the exemplary embodiment in FIG. 1.

Therefore, a novel diagnostic possibility, which is to be assigned to the principle of the measuring and monitoring of pressure pulsations in exhaust gas, i.e., in exhaust system 10 and in particular in bypass channel 80, is suggested by the method according to the present invention and the device according to the present invention. No special pressure transmitter and/or pressure sensor is necessary in this case. Instead, sensors, such as position sensor 15 or activation coil 20, which are already provided in connection with the activation of bypass valve 5 for controlling internal combustion engine 1, are used as signal production means.

The way in which the pressure pulsations at bypass valve 5 may be monitored was described above solely as an example. Of course, the present invention is not restricted to the use of bypass valve 5 as the final controlling element for the error recognition described. Rather, a final controlling element at any other point in exhaust system 10 of internal combustion engine 1 which is subjected to the described pressure pulsations in the exhaust gas may be used for implementing the present invention.

What is claimed is:

1. A method for operating an internal combustion engine, comprising:
   providing a final controlling element in an exhaust system of the internal combustion engine;
   producing a signal using a signal production unit, as a function of a setting of the final controlling element;
   comparing a value for a characteristic property of the signal to a predefined reference value; and
   ascertaining an error as a function of a deviation of the value for the characteristic property of the signal from the predefined reference value in a fired operation of the internal combustion engine;
   wherein the signal is analyzed for signal fluctuations as the characteristic property of the signal, and wherein an error is ascertained if an amplitude of the signal fluctuations of the signal falls below a predefined threshold value during a fired operation of the internal combustion engine.

2. The method as recited in claim 1, further comprising:
   filtering the signal of the signal production unit.

3. The method as recited in claim 2, wherein at least one filter is used for the filtering, and wherein a pass-band of the at least one filter is set as a function of an engine speed of the internal combustion engine.

4. The method as recited in claim 1, further comprising:
   detecting, by the signal production unit, a position setting of one of the final controlling element and an electrical drive for setting the final controlling element, wherein the signal production unit is a position sensor.

5. The method as recited in one of claim 1, further comprising:
   setting the final controlling element by an armature that is connected to the final controlling element, in a magnetic field of an activation coil, wherein the activation coil is the signal production unit.

6. The method as recited in claim 1, wherein the deviation of the value for the characteristic property of the signal from the predefined reference value is analyzed as a function of an operating point of the internal combustion engine.

7. The method as recited in claim 1, wherein an error in signal production of the signal is detected in a case of an error-free combustion, as a function of a deviation of the value for the characteristic property of the signal from the predefined reference value during a fired operation of the internal combustion engine.

8. A method for operating an internal combustion engine, comprising:
   providing a final controlling element in an exhaust system of the internal combustion engine;
   producing a signal using a signal production unit, as a function of a setting of the final controlling element;
   comparing a value for a characteristic property of the signal to a predefined reference value; and
   ascertaining an error as a function of a deviation of the value for the characteristic property of the signal from the predefined reference value in a fired operation of the internal combustion engine;
   wherein a misfire during combustion is detected as a function of the deviation of the value for the characteristic property of the signal from the predefined reference value during a fired operation of the internal combustion engine.

9. The method as recited in claim 8, wherein one of a chronological signal gradient and a signal gradient in relation to a crankshaft angle is analyzed as the characteristic property of the signal, and wherein the error is ascertained if one of: a) the chronological signal gradient maintains its sign longer than a predefined time during a fired operation of the internal combustion engine; and b) the signal gradient in relation to the crankshaft angle maintains its sign for a crankshaft angle range beyond a predetermined angle range during a fired operation of the internal combustion engine.

10. A method for operating an internal combustion engine, comprising:
    providing a final controlling element in an exhaust system of the internal combustion engine;
    producing a signal using a signal production unit, as a function of a setting of the final controlling element;
    comparing a value for a characteristic property of the signal to a predefined reference value; and
    ascertaining an error as a function of a deviation of the value for the characteristic property of the signal from the predefined reference value in a fired operation of the internal combustion engine;
    wherein a chronological mean value of the signal is analyzed as the characteristic property of the signal, and wherein an error is ascertained if an absolute value of the chronological mean value deviates from a predetermined value by more than a predefined tolerance value during a fired operation of the internal combustion engine.

11. A method for operating an internal combustion engine, comprising:
    providing a final controlling element in an exhaust system of the internal combustion engine;
    producing a signal using a signal production unit, as a function of a setting of the final controlling element;
    comparing a value for a characteristic property of the signal to a predefined reference value; and
    ascertaining an error as a function of a deviation of the value for the characteristic property of the signal from the predefined reference value in a fired operation of the internal combustion engine;
    wherein a frequency spectrum of the signal is analyzed as the characteristic property of the signal, and wherein an error is ascertained if at least one frequency component of the frequency spectrum that is characteristic of an error during combustion occurs, the at least one frequency component having an amplitude exceeding a predetermined tolerance value during a fired operation of the internal combustion engine.

12. A system for detecting an error in operation of an internal combustion engine, comprising:
    a final controlling element positioned in an exhaust system of the internal combustion engine;
    a signal production unit for producing a signal as a function of a setting of the final controlling element;
    an analysis unit for analyzing the signal for signal fluctuations as a characteristic property of the signal; and
    an error recognition unit which compares a value for the characteristic property of the signal to a predetermined reference value, wherein the predefined reference value is a predefined threshold value and the error recognition unit ascertains an error if an amplitude of the signal fluctuations of the signal falls below the predetermined reference value during a fired operation of the internal combustion engine.

13. A device for operating an internal combustion engine, comprising:
a signal producing arrangement to produce a signal as a function of a setting of a final controlling element, the final controlling element being in an exhaust system of the internal combustion engine;
an analysis arrangement to analyze the signal for signal fluctuations as a characteristic property of the signal; and
an error recognition arrangement to compare a value for the characteristic property of the signal to a predefined threshold value and to recognize an error if an amplitude of the signal fluctuations of the signal falls below the predefined value during a fired operation of the internal combustion engine.

* * * * *